United States Patent [19]

Greenland

[11] Patent Number: 4,843,724
[45] Date of Patent: Jul. 4, 1989

[54] SPIRIT LEVEL

[76] Inventor: Darrell Greenland, 934 Fourth St. #21, Santa Monica, Calif. 90403

[21] Appl. No.: 182,133

[22] Filed: Apr. 15, 1988

[51] Int. Cl.⁴ .............................................. G01C 9/28
[52] U.S. Cl. .................................................. 33/386
[58] Field of Search ......................... 33/379, 384, 386

[56] References Cited

U.S. PATENT DOCUMENTS 1,017,646  2/1912  Broadmore .......................... 33/386
4,463,501  8/1984  Wright .............................. 33/379 X

FOREIGN PATENT DOCUMENTS 2724870  12/1978  Fed. Rep. of Germany ........ 33/381
336604   4/1959   Switzerland .......................... 33/379

Primary Examiner—Harry N. Haroian
Attorney, Agent, or Firm—Cislo & Thomas

[57] ABSTRACT

A spirit level comprising a hollow rectangular bar of extruded material formed with at least one recess for receiving a bubble tube and having end caps for closing the ends of said bar; together with a sealed capsule, mountable adjacent said recess, containing a bubble tube and adjustment mechanism therefor.

7 Claims, 1 Drawing Sheet

U.S. Patent    Jul. 4, 1989    4,843,724
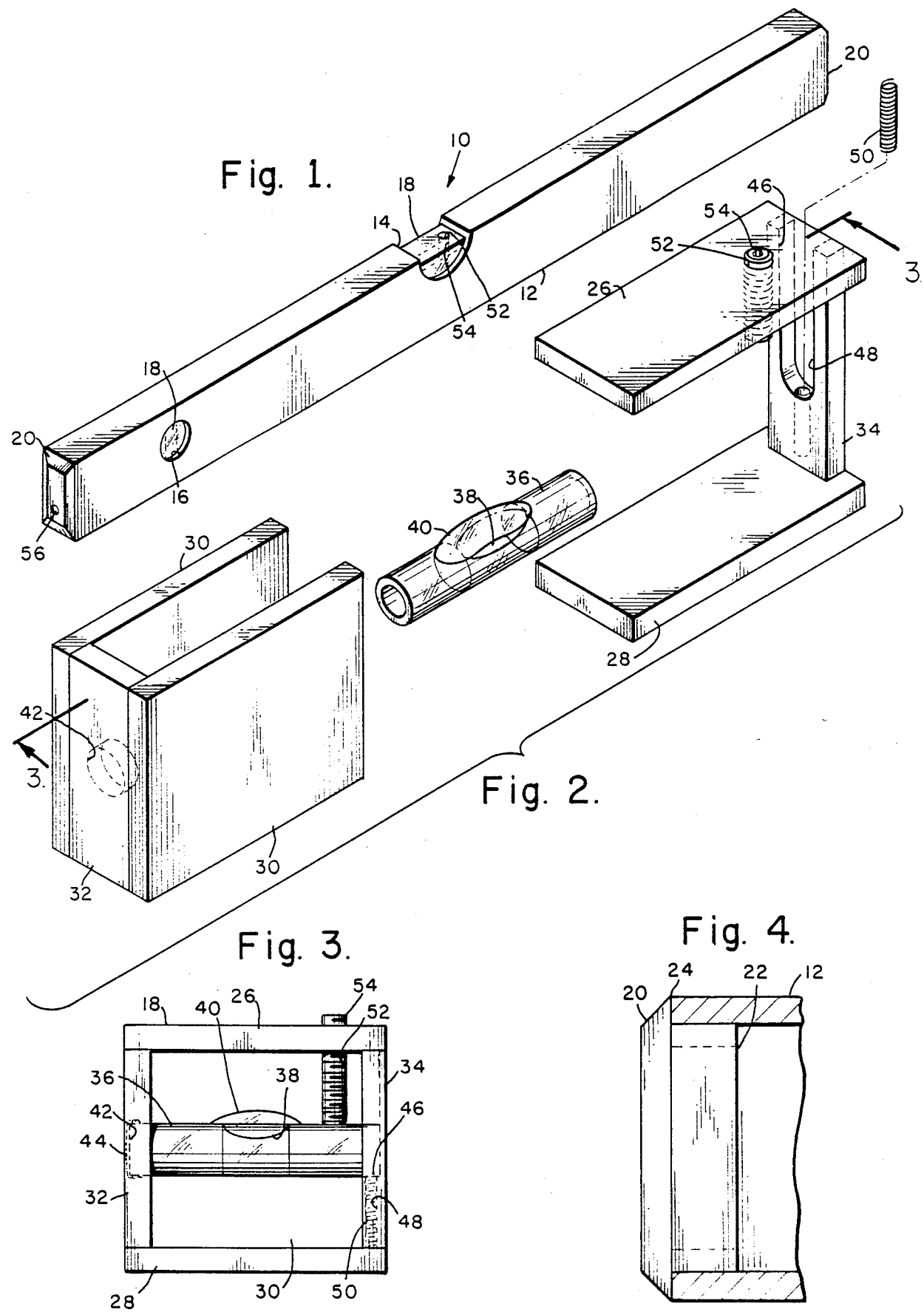

SPIRIT LEVEL

BACKGROUND OF THE INVENTION

This invention relates to spirit levels and is particularly directed to spirit levels which are uniquely suited to mass production and which provide unique protection of the bubble tube against contamination by dirt, grease or the like.

Spirit levels have long been useful in carpentry and construction work for assuring that a surface is truly horizontal or vertical. Traditionally, spirit levels have comprised one or more slightly arcuate tubes substantially filled with fluid but containing an air bubble. By mounting these "bubble tubes" on an elongated bar, with the curve lying convexly with respect to the surface of the bar, the air bubble will tend to move toward the center or high point of the tube and, by calibrating the device on a known level surface and providing sight lines at the center or opposite edges of the bubble, the device can be used subsequently to measure the levelness of an unknown surface. Customarily, one or more adjustment screws are provided to permit slight movement of the bubble tube during calibration. Unfortunately, spirit levels are frequently used in carpentry or construction areas where there is considerable dust, sawdust, grease and the like which can intrude into the region about the bubble tube and can interfere with the positioning and calibration of the bubble tube. Furthermore, the mounting, positioning and calibration of the bubble tube on the bar has, in the past, required a considerable amount of manual labor, which has restricted or prevented the mass production of spirit levels and, consequently, has caused them to be relatively expensive.

A search in the U.S. Patent Office has revealed the following patents:

| U. S. Pat. No. | Inventor | Issued |
| --- | --- | --- |
| 353,846 | G. Cook | Dec. 7, 1886 |
| 421,786 | J. A. Traut | Feb. 18, 1890 |
| 465,882 | C. E. Peterson | Dec. 29, 1891 |
| 1,017,646 | G. Broadmore | Feb. 20, 1912 |
| 1,515,239 | H. J. Cook | Nov. 11, 1924 |
| 1,815,949 | O. Marischal | July 28, 1931 |
| 2,101,077 | A. Langsner | Dec. 7, 1937 |
| 2,301,769 | F. A. Babcock | Nov. 10, 1942 |
| 2,557,291 | R. T. Hubbard | June 19, 1951 |
| 2,567,553 | C. P. Davey | Sept. 11, 1951 |
| 4,299,035 | S. Stauber | Nov. 10, 1981 |
| 4,542,592 | R. E. Hopkins | Sept. 24, 1985 |

The patents to Broadmore and Cook each disclose spirit levels wherein the bubble tube is protected from invasion by dirt, but each require considerable manual labor to assemble and calibrate. The remaining patents each disclose spirit levels in which the bubble tube and the adjusting mechanism therefor are exposed and susceptible to invasion by dirt and dust. Thus, none of the prior art devices are entirely satisfactory.

These disadvantages of prior art spirit levels are overcome with the present invention and a spirit level is provided which totally precludes intrusion of dirt, dust or the like into the region of the bubble tube or its adjustment mechanism, yet which requires minimal manual labor for assembly and calibration and, hence, is particularly well suited to mass production.

The advantages of the present invention are preferably attained by providing a spirit level formed of a hollow, rectangular bar of extruded material having end caps for closing the ends thereof and formed with recesses formed in said bar for receiving bubble tubes; together with a sealed capsule, mountable adjacent said recesses, containing a bubble tube and adjustment mechanism therefor. Because the bubble tube and adjustment mechanism are sealed within the capsule, invasion by dirt or dust is virtually precluded. Moreover, should the capsule or its contents become damaged in any way, they can readily be removed and replaced. Also, the capsules can be produced independently, in any desired quantity, and can be assembled quickly and easily with the extruded bar and end caps to permit mass production of spirit levels embodying the present invention.

Accordingly, it is an object of the present invention to provide improved spirit levels.

Another object of the present invention is to provide improved spirit levels which virtually preclude invasion of the region about the bubble tube or its adjusting mechanism.

An additional object of the present invention is to provide spirit levels which are uniquely adapted to mass production.

A further object of the present invention is to provide spirit levels wherein the bubble tube can be replaced quickly and easily.

A specific object of the present invention is to provide a spirit level comprising a hollow rectangular bar of extruded material formed with at least one recess for receiving a bubble tube and having end caps for closing the ends of said bar; together with a sealed capsule, mountable adjacent said recess, containing a bubble tube and adjustment mechanism therefor.

These and other objects and features of the present invention will be apparent from the following detailed description, taken with reference to the figures of the accompanying drawing.

BRIEF DESCRIPTION OF THE DRAWINGS

FIG. 1 is an isometric view of a spirit level embodying the present invention;

FIG. 2 is an exploded isometric view of the bubble tube capsule of the spirit level of FIG. 1;

FIG. 3 is a transverse section through the assembled bubble tube capsule of FIG. 2 taken on the line 3—3 of FIG. 2; and FIG. 4 is a side view of one of the end caps of the spirit level of FIG. 1.

DETAILED DESCRIPTION OF THE INVENTION

In that form of the present invention chosen for purposes of illustration in the drawing, FIG. 1 shows a spirit level, indicated generally at 10, comprising a hollow, rectangular bar 12, of extruded material, such as metal or a rigid plastic, formed with recesses 14 and 16 for receiving bubble tube capsules 18. End caps 20 are provided for closing the ends of the bar 12. The end caps 20 may be formed of substantially any desired material and, as best seen in FIG. 4, are formed with a rearwardly projecting flange 22 spaced slightly inward from the peripheral edges 24 of the end cap 20 and serving to frictionally engage the interior of the hollow bar 12 to releaseably retain the end cap 20 in position to close the end of the bar 12 against invasion by dirt, dust or the like.

The bubble tube capsules 18 are identical and, as best seen in FIGS. 2 and 3, each comprises a hollow, box-like structure having a top 26 and bottom 28 which overlie a pair of side walls 30 and right and left end pieces, seen at 32 and 34 respectively. The top 26, bottom 28, side walls 30 and end pieces 32 and 34 are preferably formed of rigid, transparent material, such as plastic, and are sized to nest together to form the box-like capsule 18, as seen in FIG. 3. Finally, a cylindrical bubble tube 36 is provided containing a suitable fluid and having a small bubble 38 therein, as is well known in the art. The upper surface may be curved for magnification purposes well known in the art.

To assemble the bubble tube capsule 18, a circular recess 42 is formed extending part way through the left end piece 32 which is large enough to loosely receive the left end of the bubble tube 18 and a layer 44 of resilient material, such as polyurethane silicone, is provided about the end of the bubble tube 18 to serve as a resilient cushion and adhesive, securing the tube 18 in position within the recess 42.

Similarly, a vertically-elongated oval recess 46 extends part way through the right end piece 34 to slideably receive the right end of the bubble tube 18, while allowing room for avertical movement of the bubble tube 18 by the adjustment mechanism. To form the adjustment mechanism, a vertical recess 48 is formed within the right end piece 34 and communicates with the bottom of the oval recess 46, as best seen in FIG. 3. A spring 50 is located within the vertical recess 48 and bears against the bottom of the end of the bubble tube 18 to urge the right end of the bubble tube 18 upward within the oval recess 46. Finally, a threaded opening 52 extends vertically through the top 26 at a point spaced from the right end thereof and an Allen screw 54, or the like, is threaded into the opening 52 to bear against the upper surface of the bubble tube 18, as seen in FIG. 3. Threading the Allen screw 54 inwardly will serve to force the right end of the bubble tube 18 downward within the oval recess 46, while threading the Allen screw 54 outwardly will permit spring 50 to urge the right end of the bubble tube 18 upwardly within the oval recess 46.

To produce the spirit level 10 of FIG. 1, the hollow, rectangular bar 12 of extruded material is provided and the recesses 14 and 16 are formed in the bar 12. Then, bubble tube capsules 18 are secured within the bar 12 adjacent the recesses 14 and 16 by suitable means, such as adhesive, and end caps 20 are frictionally urged into position to close the ends of the bar 12. The spirit level 10 may be calibrated by placing the bar 12 on a known level surface and adjusting the neutral position of the bubble 38 within the bubble tube 36 of the capsule 18 by appropriate rotation of the Allen screws 54. Subsequent recalibration of the spirit level 10 may be accomplished, in the same manner, whenever necessary or desirable. Moreover, should one of the bubble tube capsules 18 become damaged in any way, it can quickly and easily be removed and replaced by another similar bubble tube capsule 18.

If desired, the upper surface of Top 26 and/or alternately the bubble tube 36 may be formed somewhat convex, as seen at 40 and in FIG. 2, to provide magnification adjacent the neutral position of the bubble 38 within the bubble tube 36. Also, if desired, the bottom 28 and side walls 30 of the bubble tube capsule 18 may be provided with reflective tape to facilitate viewing of the bubble 38 within the capsule 18. Moreover, if desired, an opening 56 may be provided through the end cap 20 adjacent the recess 16 of the bar 12 to permit access to the Allen screw 54 of the adjacent one of the bubble tube capsules 18 without requiring removal of that end cap 20.

In addition, numerous other variations and modifications may be made without departing from the present invention. Therefore, it should be clearly understood that the form of the present invention described above and shown in the accompanying drawings is illustrative only and is not intended to limit the scope of the present invention.

I claim:

1. A spirit level comprising:
   a hollow rectangular bar of extruded material formed with at least one recess for receiving a bubble tube capsule,
   a pair of end caps of closing the ends of said bar,
   a sealed bubble tube capsule mountable within said bar adjacent said recess and containing a bubble tube and adjustment mechanism therefore, wherein said bubble tube capsule comprises a top, a bottom, two side walls and two end pieces composed of rigid, transparent material and forming a box-like structure;
   a cylindrical tube substantially filed with liquid and having a bubble therein, said tube being mounted within said box-like structure, adjusting mechanism located within said box-like structure for adjusting the position of said tube,
   wherein said bubble tube capsule further comprises:
   a circular recess extending part way through one of said end pieces formed to slideably receive one end of said tube,
   a quantity of resilient adhesive material flexibly securing said one end of said tube within said circular recess,
   a vertically elongated oval recess formed in the other of said end pieces to slideably receive the opposite end of said tube,
   a threaded opening extending vertically through said top of said capsule at a point from said other of said and pieces, and
   screw means threaded through said threaded opening and engaging the upper surface of said tube and positionable to drive said opposite end of said tube downwardly against the action of said spring.

2. The spirit level of claim 1 wherein said adjusting mechanism comprises:
   a vertical recess formed within said other of said end pieces and communicating with the bottom of said oval recess,
   a spring located within said vertical recess and bearing serving to urge said opposite end of said tube upward,
   a threaded opening extending vertically through said top of said capsule at a point spaced from said other of said end pieces, and
   screw means threaded through said threaded opening and engaging the upper surface of said tube and positionable to drive said opposite end of said tube downwardly against the action of said spring.

3. A bubble tube capsule comprising:
   a top, a bottom, two side walls and two end pieces composed of rigid, transparent material and forming a box-like structure:

a cylindrical, or tube substantially filled with liquid and having a bubble therein, said tube being mounted within said box-like structure, adjusting mechanism located within said box-like structure for adjusting the position of said tube, wherein said bubble tube capsule further comprising:

a circular recess extending part way through one of said end pieces formed to slideably receive one end of said tube, a quantity of resilient adhesive material flexibly securing said one end of said tube within said circular recess, a vertically elongated oval recess formed in the other of said end pieces to slideably receive the opposite end of said tube, and magnification means on one of said top wall and cylindrical tube for ease of reading said bubble in said cylindrical tube.

4. The bubble tube capsule of claim 3 wherein said adjustment mechanism comprises:

a vertical recess formed within said other of said end pieces and communicating with the bottom of said oval recess, a spring located within said vertical recess and bearing serving to urge said opposite end of said tube upward, a threaded opening extending vertically through said top of said capsule at a point spaced from said other of said end pieces, and screw means threaded through said threaded opening and engaging the upper surface of said tube and positionable to drive said opposite end of said tube downwardly against the action of said spring.

5. A spirit level comprising:

a hollow rectangular bar of extruded materials formed with at least one recess for receiving a bubble tube capsule, a pair of end caps for closing the ends of said bar, a sealed bubble tube capsule mountable within said bar adjacent said recess and containing a bubble tube and adjustment mechanism therefor, wherein said bubble tube capsule comprises:

a top, a bottom, two side walls and two end pieces composed of rigid, transparent materials and forming a box-like structure;

a cylindrical tube substantially filled with liquid and having a bubble therein, said tube being mounted within said box-like structure, and adjusting mechanism located within said box-like structure for adjusting the position of said tube, wherein said bubble tube capsule further comprises:

a circular recess extending part way through one of said end pieces formed to slideably receive one end of said tube, a quantity of resilient adhesive material flexibly securing said one end of said tube within said circular recess, a vertically elongated oval recess formed in the other of said end pieces to slideably received the opposite end of said tube.

6. The spirit level of claim 5, wherein said adjusting mechanism comprises:

a vertical recess formed within said other of said end pieces and communicating with the bottom of said oval recess, a spring located within said vertical recess and bearing serving to urge said opposite end of said tube upward, a threaded opening extending vertically through said top of said capsule at a point spaced from said other of said end pieces, and screw means threaded through said threaded opening and engaging the upper surface of said tube and positionable to drive said opposite end of said tube downwardly against the action of said spring.

7. A bubble tube capsule comprising:

a top, a bottom, two side walls and two end pieces composed of rigid, transparent material and forming a box-like structure;

a cylindrical tube substantially filled with liquid and having a bubble therein, said tube being mounted within said box-like structure, and adjusting mechanism located within said box-like structure for adjusting the position of said tube, and said tube capsule further comprising:

a circular recess extending part way through one of said end pieces formed to slideably receive one end of said tube, a quantity of resilient adhesive material flexibly securing said one end of said tube within said circular recess, a vertically elongated oval recess formed in the other of said end pieces to slideably received the opposite end of said tube, and magnification means on one of said top wall and cylindrical tube for ease of reading said bubble in said cylindrical tube, and wherein said adjustment mechanism comprises:

a vertical recess formed within said other of said end pieces and communicating with the bottom of said oval recess, a spring located within said vertical recess and bearing serving to urge said opposite end of said tube upward, a threaded opening extending vertically through said top of said capsule at a point spaced from said other of said end pieces, and screw means threaded through said threaded opening and engaging the upper surface of said tube and positionable to drive said opposite end of said tube downwardly against the action of said spring.

* * * * *